though not showing any sharp melting point. Neutral solutions of
the ester show a strong fluorescence.

300 mg. of the pyridoxal-4'-N-dimethyl-glycyl-hydrazone-5'-triphosphoric acid ester obtained are heated for 8 minutes to 100° C. in 30 cc. of N-hydrochloric acid. Thereupon, 300 mg. of silver nitrite are added to the solution and heating is continued for 2 minutes at a temperature of 100° C. The reaction mixture is cooled down and is concentrated to dryness under reduced pressure at a low temperature. The viscous residue is extracted several times with water-free acetone, then it is dissolved in as little water as possible and finally precipitated by the addition of water-free acetone. The precipitate is dissolved again in 30 cc. of water and the solution is adjusted to pH 2–3 by cautious addition of powdered calcium hydroxide; at the end, calcium hydroxide solution is added dropwise until the pH has reached the value of 8–9. The yellow precipitate is centrifuged off and extracted with distilled water at 20° C.; the extraction is continued until the extracts do not take a yellow color anymore. The mother-liquor of the precipitate which separates at pH 8–9 and the aqueous extracts of the precipitate are united, the solution is brought to pH 7 and evaporated under reduced pressure at low temperature. During the concentrating operation, the calcium salt of pyridoxal-5'-phosphoric acid ester begins to separate from the solution. When the volume of the solution is 10 cc., the pH is again adjusted to 8–9 by the addition of a few drops of calcium hydroxide solution. Then 40 cc. of absolute alcohol are added to cause the separation of the calcium salt of pyridoxal-5'-phosphoric acid ester. This salt is a lemon-yellow colored, only slightly hygroscopic powder, which is difficultly soluble in cold water. It shows the activity of codecarboxylase.

MANUFACTURE OF PYRIDOXAL-5'-PHOSPHORIC ACID ESTER AND SALTS THEREOF

Paul Karrer and Max Viscontini, Zurich, Switzerland, assignors to Hoffmann-La Roche Inc., Nutley, N. J., a corporation of New Jersey No Drawing. Application June 28, 1952,
Serial No. 296,258

Claims priority, application Switzerland July 25, 1951

7 Claims. (Cl. 260—297)

The present invention provides a process for the manufacture of pyridoxal-5'-phosphoric acid ester and of salts thereof. The novel process comprises reacting pyridoxal with hydrazines, or semicarbazides, or hydroxylamine to protect the aldehyde group, phosphorylating the compound obtained at its 5'-position by means of meta-phosphoric acid and hydrolysing the phosphorylation product to remove the aldehyde protecting group and 2 mols of ortho-phosphoric acid, whereupon the pyridoxal-5'-phosphoric acid ester, if desired, is isolated as a salt. For isolation purposes, the pyridoxal-5'-phosphoric acid ester is preferably reacted with an alkaline earth metal salt forming compound to produce an alkaline earth metal salt of pyridoxal-5'-phosphoric acid ester.

The reactions involved may be represented as follows:

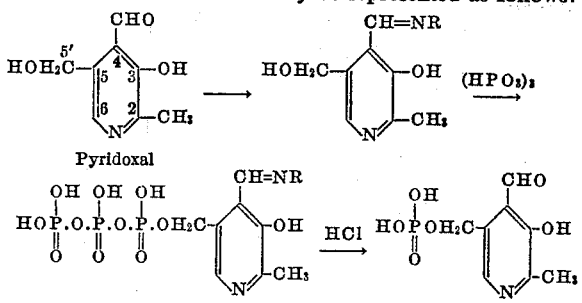

R=—NHCOCH₂N(CH₃)₂, —NHCOC₆H₅ or —OH or similar radicals.

Example 1

To a solution of 4.4 grams of pyridoxal in 30 cc. of water are added 10 grams of sodium acetate and 7.75 grams of N-dimethyl-glycyl-hydrazine hydrochloride, the pH of the solution being maintained between 4 and 6. The reaction mixture is kept at room temperature, until after several days about 90% of the theoretical yield of yellow crystals of the pyridoxal-4'-N-dimethyl-glycyl-hydrazone hydrochloride have separated.

The N-dimethyl-glycyl-hydrazone hydrochloride of pyridoxal contains 1 mol HCl and 2 mols H₂O and melts at 208–212° C. The compound is only slightly soluble in cold water and in alcohol, while being easily soluble in hot water; it is insoluble in ether.

The meta-phosphoric acid required for the phosphorylation is prepared by heating 85% ortho-phosphoric acid (Helvetica Chimica Acta, volume 29 [1946], page 711 and volume 32, [1949], page 1478). After the meta-phosphoric acid formed is cooled down to 60° C., an amount of 200 mg. of pyridoxal-4'-N-dimethyl-glycyl-hydrazone hydrochloride for each cc. of meta-phosphoric acid is added and homogeneously dispersed throughout the acid by stirring. The crystals of the hydrazone dissolve slowly, whereby hydrogen chloride separates. After completion of the dissolution, the reaction mixture is cooled down to 0° C. and mixed thoroughly with an equal volume of ice-water. Thereupon, 25–30 cc. of alcohol are poured into the mixture, causing the phosphorylation product to separate. The purification of the pyridoxal-4'-N-dimethyl-glycyl-hydrazone-5'-triphosphoric acid ester is effected by dissolving the same in a little amount of water and reprecipitating by adding absolute ethanol. The compound is obtained in the form of a colorless powder, which decomposes upon heating to a high temperature without

Example 2

500 mg. of pyridoxal-4'-N-dimethyl-glycyl-hydrazone are phosphorylated with 3–4 cc. of meta-phosphoric acid for 20 minutes at 60° C. in the manner described in Example 1. After having diluted the cooled reaction mixture with a small amount of water, the 5'-triphosphoric acid ester of pyridoxal-4'-N-dimethyl-glycyl-hydrazone is precipitated by means of absolute alcohol. It is now sufficiently pure for being processed further. The crude material is hydrolysed with N-hydrochloric acid and nitrous acid or, respectively, silver nitrite in the manner described in Example 1. Thereupon, the solution is evaporated to dryness at reduced pressure and at low temperature, the residue is taken up in 30 cc. of water and a suspension of colloidal magnesium hydroxide (prepared from magnesium ethylate) is added slowly until the pH of the solution is 4–5. Without filtration, 1 cc. of concentrated aqueous ammonium hydroxide is poured into the solution to cause a crystalline precipitate of magnesium-ammoniumphosphate to separate. The precipitate is sucked off and rinsed well with a large amount of water. The mother-liquor and the wash-water are concentrated in vacuo at a low temperature to a volume of 5–10 cc., the pH is brought to 8 by the addition of magnesium-hydroxide, the solution is filtered and 50 cc. of absolute alcohol are added. The magnesium salt of pyridoxal-5'-phosphoric acid ester separates. It is sucked off and washed with alcohol and ether. It consists of a yellow, easily water-soluble powder having a strong codecarboxylase activity. The yield is 250–300 mg., i. e. about 45–55% with respect to the hydrazone used.

Example 3

Pyridoxal-4'-benzoyl-hydrazone is prepared by dissolving 470 mg. of pyridoxal-hydrochloride in 5 cc. of water, by adding the calculated amount of benzoyl-hydrazine and little sodium acetate, and by heating the solution to the boiling point. The yellow crystals of pyridoxal-4'-benzoyl-hydrazone of melting point 230° C., which separate from the liquid after cooling, may be used as such for the subsequent phosphorylation.

240 mg. of the hydrazone mentioned above are heated to 60° C. with 1.5 cc. of meta-phosphoric acid while stirring, whereby the hydrazone goes into solution. After having maintained the mixture at the said temperature for 20–30 minutes, it is cooled down to 0° C. and mixed with little cold water. The pyridoxal-4'-benzoyl-hydrazone-5'-triphosphoric acid ester formed is difficultly soluble in water and separates from the solution. It is washed well with water and dried in vacuo.

For the hydrolysis of the above triphosphoric acid ester 160 mg. thereof are heated for 8 minutes to 100° C. with 20 cc. of N-hydrochloric acid. Then 200 mg. of silver nitrite are added to the solution and the latter is heated to 100° C. for two additional minutes. After cooling down, the liquid is evaporated to dryness at a low temperature, the viscous residue is extracted several times with water-free acetone, dissolved in as little water as possible and reprecipitated by the addition of water-free acetone. The precipitate is taken up again in 15 cc. of water and the solution is adjusted to pH 2–3 by cautious addition of powdered calcium carbonate. Finally, calcium hydroxide solution is added dropwise until the pH is 8–9. The yellow precipitate of the calcium salt of pyridoxal-5'-phosphoric acid ester formed is centrifuged off and extracted with distilled water at 20° C. until the extracts do not become yellow colored anymore. The mother-liquor of the precipitate obtained at pH 8–9 and the aqueous extracts mentioned just before are united, brought exactly to pH 7 and evaporated in vacuo at a low temperature. During this operation, the calcium salt of pyridoxal-5'-phosphoric acid ester begins to separate. Once the volume of the solution has reached 7 cc., alcohol is added to cause the pyridoxal-5'-phosphoric acid ester to precipitate completely. After centrifuging off, the ester is washed with alcohol and ether.

We claim:
1. A process which comprises reacting pyridoxal with a hydrazine to protect the aldehyde group, phosphorylating the hydrazone thus obtained at its 5'-position by means of meta-phosphoric acid, hydrolysing the phosphorylation product so as to remove the aldehyde protecting group and 2 mols of ortho-phosphoric acid, and separating the pyridoxal-5'-phosphoric acid ester.

2. The process according to claim 1, wherein the pyridoxal is treated with N-dimethyl-glycyl-hydrazine to protect the aldehyde group.

3. The process of claim 1, wherein the pyridoxal is treated with benzoyl-hydrazine to protect the aldehyde group.

4. The process of claim 1, wherein the pyridoxal-5'-phosphoric acid ester is reacted with an alkaline earth metal compound and is isolated in the form of an alkaline earth metal salt.

5. A 5'-triphosphoric acid ester of pyridoxal-4'-N-dimethyl-glycyl-hydrazone.

6. A 5'-triphosphoric acid ester of pyridoxal-4'-benzoyl-hydrazone.

7. A process of making pyridoxal 5'-phosphoric acid ester which comprises hydrolysing with a dilute mineral acid a 2 - methyl - 3 - hydroxy - 4 - aldehydo - 5 - triphosphatomethyl-pyridine, wherein the aldehyde group has been protected by reaction with a hydrazine, so as to remove the protecting group and 2 mols of ortho phosphoric acid.

References Cited in the file of this patent
UNITED STATES PATENTS 2,519,470  Hoffman _____ Aug. 20, 1950
2,540,946  Hoffman et al. _____ Feb. 6, 1951

OTHER REFERENCES

Snell: J. Biol. Chem., vol. 154, pp. 313–4 (1944).
Heyl et al.: J. A. C. S., vol. 70, pp. 3429–31 (1948).
Harris et al.: Chem. Abst., vol. 39, col. 1166 (1945).
Karrer et al.: Chem. Abst., vol. 41, col. 2757 (1947).
Girard et al.: Helv. Chim. Acta., vol. 19, pp. 1095–1107 (1936).